(No Model.)
T. A. EDISON.
PHONOGRAPH.
No. 500,281. Patented June 27, 1893.
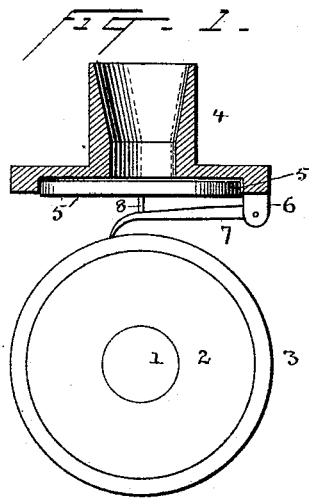
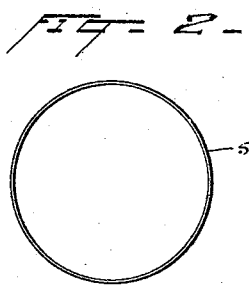
Witnesses
Norris A. Clark.
Nicholas F. Oberle
Inventor
T. A. Edison,
By his Attorneys
Dyer & Seely.

UNITED STATES PATENT OFFICE.

THOMAS A. EDISON, OF LLEWELLYN PARK, NEW JERSEY.

PHONOGRAPH.

SPECIFICATION forming part of Letters Patent No. 500,281, dated June 27, 1893.

Application filed November 21, 1890. Serial No. 372,226. (No model.)

*To all whom it may concern:*

Be it known that I, THOMAS A. EDISON, a citizen of the United States, residing at Llewellyn Park, in the county of Essex and State of New Jersey, have invented a certain new and useful Improvement in Phonographs, (Case No. 885,) of which the following is a specification.

My invention relates to the manner of constructing and mounting the sound receiving or the reproducing diaphragm or vibrating body and the recorder or reproducer in phonographs, and the object is to construct an apparatus which shall operate satisfactorily notwithstanding irregularities or eccentricities which are sometimes found in phonogram blanks owing to imperfections in their manufacture, or to warping after manufacture.

In the accompanying drawings which illustrate the invention, Figure 1 shows a central section of a recorder embodying the improvement. Fig. 2 is a plan of the vibrating diaphragm or body.

1 is the phonograph shaft, 2 the phonograph cylinder, and 3 the phonogram blank.

4 is a mouth piece, below which is a cup shaped body 5, the bottom of which constitutes the phonograph diaphragm. This body is unconfined at its edges so that it has a bodily movement up or down without changing the tension of the portion which constitutes the diaphragm and is supported on or by the operating point.

6 is a post to which is pivoted or movably connected, a recorder or reproducer 7, the free point of which rests on the phonogram blank.

8 is a rod, block or similar device, which connects the recorder or reproducer with the vibrating body.

In using the apparatus above described when irregularites of the blank come under the point of the recorder or reproducer the diaphragm or vibrating body is raised or lowered bodily as will be evident, but when the recorder or reproducer is subjected to the very rapid vibrations due to sound waves, or to the sound record, the vibrating body will not move up or down as a whole owing to the inertia of the body, but will vibrate as an ordinary diaphragm.

It will be evident that the form of the vibrating body may be changed without departing from my invention—for example the vertical rim 5' around the edge of the body is not essential, although it is found that the weight of the rim around the edge is advantageous.

Having thus described my invention, what I claim is—

1. The combination, in a phonograph having a phonogram blank or recording surface, of a recorder or reproducer in operative relation to said blank, and a diaphragm or vibrating body unsupported at its edge, and a connection between said recorder or reproducer and diaphragm, substantially as described.

2. The combination, in a phonograph having a phonogram blank or recording surface, of a recorder or reproducer in operative relation to said blank, a diaphragm having an unconfined rim around its periphery, and a connection between said recorder or reproducer and diaphragm, substantially as described.

3. The combination of a phonograph diaphragm unconfined at its periphery and a recorder or reproducer connected to the diaphragm, substantially as described.

4. The combination, in a phonograph, of a diaphragm unconfined at its periphery, a phonogram blank, a pivoted recorder or reproducer in operative relation to said blank and connected to the diaphragm at or near its center, substantially as described.

5. The combination of a phonograph recorder or reproducer and a diaphragm supported thereby, substantially as described.

6. The combination of a phonograph recorder or reproducer and a diaphragm supported thereby and having a weight at its periphery, substantially as described.

This specification signed and witnessed this 17th day of November, 1890.

THOS. A. EDISON.

Witnesses:
HARRY F. MILLER,
THOMAS MAGUIRE.